(12) United States Patent
Hirano et al.

(10) Patent No.: US 7,040,026 B2
(45) Date of Patent: May 9, 2006

(54) WHEEL RUNOUT MEASURING METHOD

(75) Inventors: Akira Hirano, Saitama (JP); Takashi Kamoshita, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/149,250

(22) PCT Filed: Mar. 19, 2001

(86) PCT No.: PCT/JP01/02147

§ 371 (c)(1),
(2), (4) Date: Jun. 5, 2002

(87) PCT Pub. No.: WO01/86246

PCT Pub. Date: Nov. 15, 2001

(65) Prior Publication Data

US 2002/0178594 A1 Dec. 5, 2002

(30) Foreign Application Priority Data

Apr. 21, 2000 (JP) ............................. 2000-120339

(51) Int. Cl.
*G01B 5/255* (2006.01)

(52) U.S. Cl. .............................. 33/203.13; 33/203.12; 33/203; 73/146

(58) Field of Classification Search ................. 33/203, 33/203.12, 203.13, 203.14, 203.15; 73/146, 73/118.1; 702/105, 56, 33, 41
See application file for complete search history.

(56) References Cited

U.S. PATENT DOCUMENTS

| 4,138,825 A | | 2/1979 | Pelta |
| 4,180,915 A | | 1/1980 | Lill et al. |
| 4,311,044 A | * | 1/1982 | Marshall et al. ............... 73/146 |
| 4,479,381 A | * | 10/1984 | Kounkel et al. ............... 73/146 |
| 4,953,296 A | * | 9/1990 | Spainhour ................. 33/203.18 |
| 5,103,414 A | * | 4/1992 | Papadopoulos .......... 33/203.16 |
| 5,224,272 A | * | 7/1993 | Toraason et al. ............... 33/504 |
| 5,875,418 A | * | 2/1999 | Gill et al. ................. 33/203.18 |
| 5,919,238 A | * | 7/1999 | Lavey ..................... 33/203.15 |
| 5,969,246 A | * | 10/1999 | Jackson et al. .......... 33/203.18 |
| 5,969,247 A | * | 10/1999 | Carter et al. .................. 73/462 |

(Continued)

FOREIGN PATENT DOCUMENTS

JP          1-141311          2/1989

(Continued)

*Primary Examiner*—Yaritza Guadalupe
(74) *Attorney, Agent, or Firm*—Hamre, Schumann, Mueller & Larson, P.C.

(57) ABSTRACT

A method for measuring side run-out of a wheel by turning the wheel mounted on a roller supported rotatably. It is judged whether or not the difference between the side run-out of a wheel at the start point onf one turn and the end point of one turn falls within a specified range or not. If it falls within the specified range, the difference between the maximum and minimum values of the side run-out during rotation is defined as the side run-out of the wheel. Even if the wheel is displaced during measurement to cause variation in the measurement value of the side run-out, the varied measurement value can be removed and highly accurate side run-out and side run-out width can be obtained.

2 Claims, 12 Drawing Sheets

U.S. PATENT DOCUMENTS

| | | | |
|---|---|---|---|
| 6,058,614 A * | 5/2000 | Shibayama et al. | 33/203 |
| 6,219,134 B1 * | 4/2001 | Voeller et al. | 33/203.12 |
| 6,427,346 B1 * | 8/2002 | Stieff et al. | 33/203 |
| 6,481,282 B1 * | 11/2002 | Douglas et al. | 73/461 |
| 6,546,635 B1 * | 4/2003 | Gerdes | 33/203.13 |
| 6,564,461 B1 * | 5/2003 | Naruse | 33/203 |
| 6,668,635 B1 * | 12/2003 | Kunsch et al. | 73/146 |
| 6,672,148 B1 * | 1/2004 | Kunsch et al. | 73/146 |
| 6,684,516 B1 * | 2/2004 | Voeller et al. | 33/203.18 |
| 6,735,878 B1 * | 5/2004 | Lie | 33/203 |
| 6,739,186 B1 * | 5/2004 | Schartz et al. | 73/146 |
| 6,799,376 B1 * | 10/2004 | Voeller et al. | 33/203.18 |
| 6,854,329 B1 * | 2/2005 | Colarelli et al. | 73/462 |
| 2001/0008086 A1 * | 7/2001 | Colarelli et al. | 73/462 |
| 2002/0088316 A1 * | 7/2002 | Newell et al. | 82/1.11 |
| 2003/0041666 A1 * | 3/2003 | Parker | 73/462 |
| 2005/0027473 A1 * | 2/2005 | Davidson et al. | 702/151 |

FOREIGN PATENT DOCUMENTS

| | | |
|---|---|---|
| JP | 2-122343 | 5/1990 |
| JP | 4-5934 | 2/1992 |
| JP | 4-355337 | 12/1992 |

* cited by examiner

WHEEL RUNOUT MEASURING METHOD

TECHNICAL FIELD

This invention relates to a wheel runout measuring method with which it is possible to raise the precision of dynamic runout measurement of a vehicle wheel and to measure wheel alignment accurately.

BACKGROUND ART

Wheel alignment in a vehicle, expressed for example as toe-in and camber angle, is an important factor affecting the straight-line stability and steering characteristics of the vehicle, and in vehicle adjustment and inspection there is a need for its precise measurement.

A factor influencing the measurement of wheel alignment is sideways runout of the wheel, which arises from the state of the mounting of the wheel to the vehicle. When there is runout of the wheel, measured wheel alignment values deviate by an amount corresponding to the wheel runout.

Technology for obtaining wheel alignment while taking into account the affect of this runout is disclosed for example in Japanese Patent Publication No. HEI-4-5934, "WHEEL INSPECTION SYSTEM FOR 4-WHEEL VEHICLE".

This vehicle inspection system has a support table fitted with a spaced left-right pair of contact roller assemblies. The left contact roller assembly has two rotatable contact rollers. The right contact roller assembly also has two rotatable contact rollers. The left pair of contact rollers press on one side face of a vehicle wheel, and the right pair of contact rollers press on the other side face of the wheel. An angle sensor for detecting an angle of turn of the support table, that is, a runout angle corresponding to the runout of the wheel, is provided on the underside of the support table.

However, in this vehicle inspection system, for example, during runout measurement, it sometimes happens that an external force acts on the wheel, and under this external force the wheel is forcibly shifted and the measured runout value is affected.

FIG. 14 is a graph illustrating the affect of shifting of the wheel during wheel runout measurement in related art. The vertical axis shows wheel runout Sv and the horizontal axis shows time t. When rotation of the wheel is started, the wheel runout Sv varies sinusoidally with time. A predetermined time from the start of rotation of the wheel is spent running in, and after this running-in a measurement period during which the wheel turns through one revolution is provided for measuring runout.

If during this measurement period the wheel axle shifts due to a change in the weight of the vehicle under test or a movement of its steering wheel and the wheel runout Sv changes by for example δ, when the difference D1 between the maximum and minimum values of the wheel runout in the measurement period is then measured as the wheel runout amplitude, the wheel runout amplitude D2 which is actually being sought will not be measured, and an accurate wheel runout amplitude will not be obtained. As a result, it is difficult to measure aspects of wheel alignment such as toe-in and camber angle accurately.

DISCLOSURE OF THE INVENTION

It is therefore an object of the present invention to raise the precision of dynamic runout measurement of a vehicle wheel and thereby provide a wheel runout measuring method with which it is possible to measure wheel alignment accurately.

To achieve this and other objects, a first aspect of the invention provides a wheel runout measuring method for measuring left-right sideways runout of a vehicle wheel by turning the wheel on rollers, including: a step of executing measurement of the runout with the wheel rotating, and storing runout values corresponding to multiple predetermined angular measurement positions; a determining step of determining whether or not the runout difference between the runout at a first angular position among the predetermined angular positions and the runout when the wheel has rotated through one revolution from this first angular position is within a predetermined range; and a specifying step of, if said runout difference is within the predetermined range, specifying the difference between the maximum and minimum values of the runout during that rotation as a wheel runout amplitude, wherein if said runout difference is outside the predetermined range, the determining step and the specifying step are executed successively for the next predetermined angular measurement position, and the predetermined angular measurement positions are successively moved and the steps repeated until it is determined in the determining step that said runout difference has come within the predetermined range.

Thus, according to this first aspect of the invention, it is checked whether or not the difference between the runout at the starting point of a period during which the wheel rotates through one revolution and the runout at the end point of the period is within a predetermined range. And by this means, when during measurement the wheel shifts and the measured runout value shifts, it is possible to exclude this shifted measured runout value and obtain accurate wheel runout and wheel runout amplitude values.

A second aspect of the invention provides a wheel runout measuring method for measuring left-right sideways runout of a vehicle wheel by turning the wheel on rollers including the steps of: executing measurement of the runout with the wheel rotating, and comparing the difference at each of multiple angular measurement positions between the runout at the starting point of a period in which the wheel rotates through one revolution and the runout at the end point of the period; when said difference is within a predetermined range, on the basis of runouts already measured, predicting the runout at the next measurement point, and determining whether or not the wheel shifted under an external force by comparing the runout of this predicted measurement point with the runout of the respective measurement point actually measured; and when it is determined that the wheel did not shift, performing a pass/fail determination on a wheel runout amplitude that is the difference between the maximum and minimum values of the runout in that one rotation by comparing the wheel runout amplitude with a preset determination value.

Thus, according to this second aspect of the invention, in a first step, it is checked whether or not the difference between the runout at the start point of a period in which the wheel rotates through one revolution and the runout at the end point of the period is within a predetermined range, and when this difference is within the predetermined range, in the next step, to determine whether or not the wheel has been forcibly shifted by an external force, the runout of a predicted measurement point and the runout of the respective measurement point actually measured are compared, and when it is determined that the wheel did not shift, in the next step, a pass/fail determination is carried out on the wheel runout amplitude, which is the difference between the maximum and minimum values of the runout in one revolution, by comparing this wheel runout amplitude with a wheel runout amplitude determination value. In this way, by comparing the runout of a predicted measurement point and the runout of the measurement point actually measured, it is possible to determine more certainly whether the wheel has shifted; measurement can be carried out over a period not including measurements affected by shifting of the wheel; and it is possible to obtain accurate wheel runout and wheel runout amplitude values at all times.

A third aspect of the invention provides a wheel runout measuring method for measuring left-right sideways runout of a vehicle wheel by turning the wheel on rollers including the steps of: specifying wheel runout amplitudes that are differences between the maximum and minimum values of runout in one rotation of each of a front/rear left/right plurality of wheels of a vehicle; comparing the wheel runout amplitudes of the wheels with a predetermined value; and determining pass or fail according to the results of the comparison.

Thus, according to this third aspect of the invention, by comparison-processing wheel runout amplitudes of for example front/rear, left/right wheels of a four-wheel vehicle and comparing them with a predetermined value, or using a statistical analysis method, abnormal values can be removed. And accordingly, for measured wheel runout amplitude values, it is possible to measure abnormalities resulting from shifting of the wheel or other causes, in conformity with the states of all the wheels.

BEST MODE FOR CARRYING OUT THE INVENTION

Figure 1:
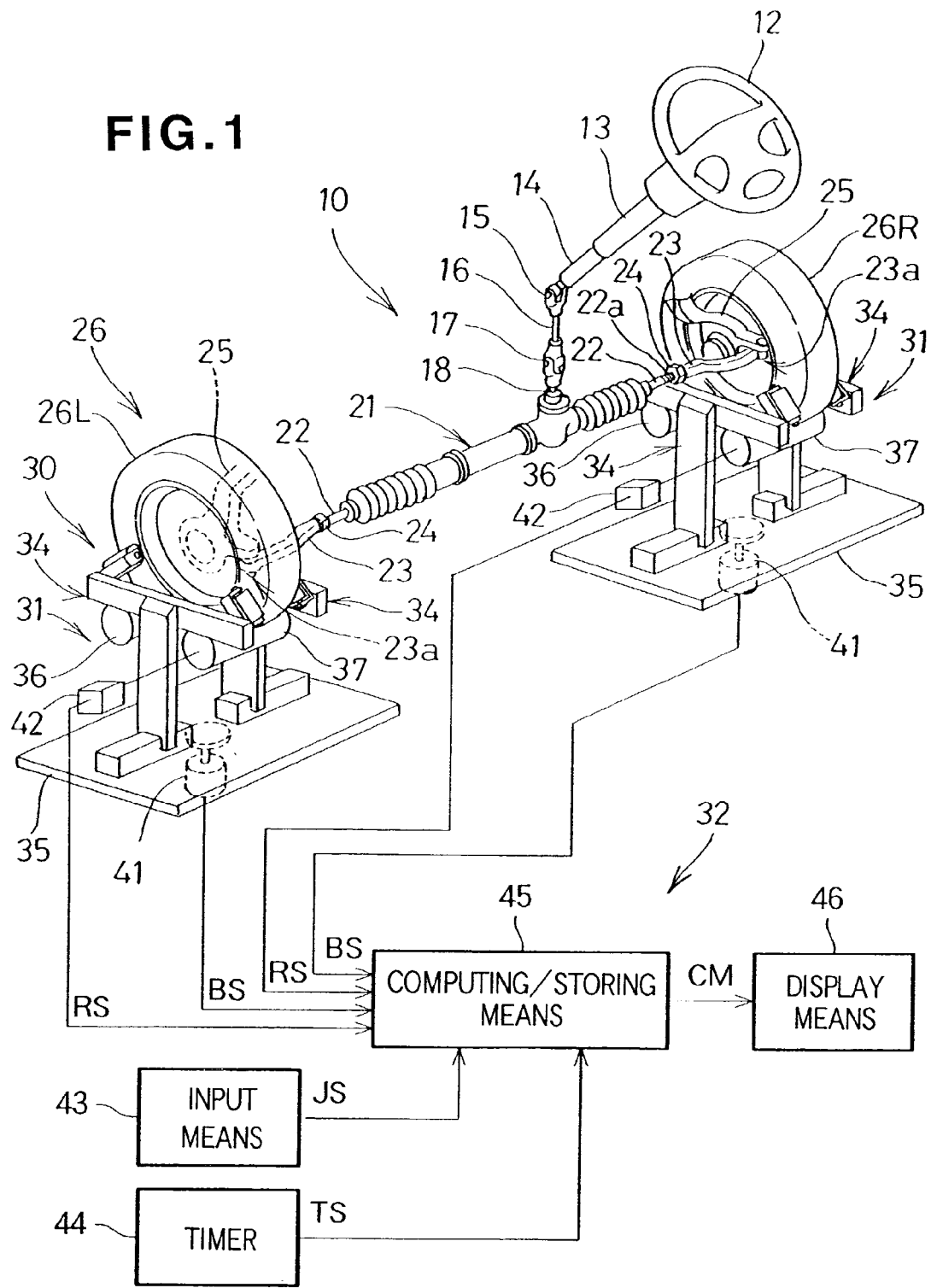
FIG. 1 is a perspective view of a steering apparatus and a wheel runout measuring apparatus for applying a wheel runout measuring method according to the invention.

FIG. 1 shows a steering apparatus and a wheel runout measuring apparatus for applying a wheel runout measuring method according to the invention. The steering apparatus 10 is made up of a steering wheel 12; a steering column 13 to which this steering wheel 12 is rotatably attached; a column shaft 14, which extends from the steering column 13 and rotates integrally with the steering wheel 12; a shaft 16, joined to the column shaft 14 by a joint 15; a pinion gear shaft 18, joined to the shaft 16 by a joint 17; and a gearbox 21, housing a rack gear and a pinion gear (not shown) mounted on the pinion gear shaft 18.

The steering apparatus 10 also has tie rods 22, attached by ball joints swingably in all directions and rotatably to the ends of the rack gear inside the gearbox 21; tie rod ends 23, 23 screwed onto threads 22a, 22a (of which only one is shown in the figure) formed on the ends of these tie rods 22, 22; lock nuts 24, 24 for locking the tie rod ends 23, 23; knuckles 25, 25 joined by ball joints 23a, 23a to the tie rod ends 23, 23; and front wheels 26 (a left front wheel 26L and a right front wheel 26R), rotatably mounted on the knuckles 25, 25 by way of hubs (not shown).

A wheel runout measuring apparatus 30, which is a wheel alignment tester, has wheel supporters 31, 31 for rotatably supporting the right and left front wheels 26L, 26R and rear wheels (not shown), and a signal processing part 32 for obtaining runouts of the front wheels 26L, 26R and computing wheel alignment components such as toe-in and camber angle. The full construction of the wheel runout measuring apparatus 30 will be discussed later.

The wheel supporters 31 are each made up of roller mechanisms 34, 34 for gripping the left front wheel 26L or right front wheel 26R from both sides, a base 35 for supporting the roller mechanisms 34, 34 and driving rollers 36, 37 for forcibly rotating the respective front wheel 26.

The signal processing part 32 is made up of angle sensors 41 for detecting runouts of the front wheels 26 by way of the roller mechanisms 34, 34 and the bases 35; rotation sensors 42 for detecting the speeds of the driving rollers 37; input means 43 for pre-inputting data needed for wheel runout measurement; a timer 44; computing/storing means 45 for receiving runout signals BS from the angle sensors 41 at set time intervals on the basis of a time signal TS from the timer 44 and rotation angle signals RS from the rotation sensors 42 (that is, measuring the wheel runouts) and receiving and processing and storing an input signal JS from the input means 43; and display means 46, for receiving and displaying a processed and stored signal processed and stored by the computing/storing means 45.

Figure 2A:
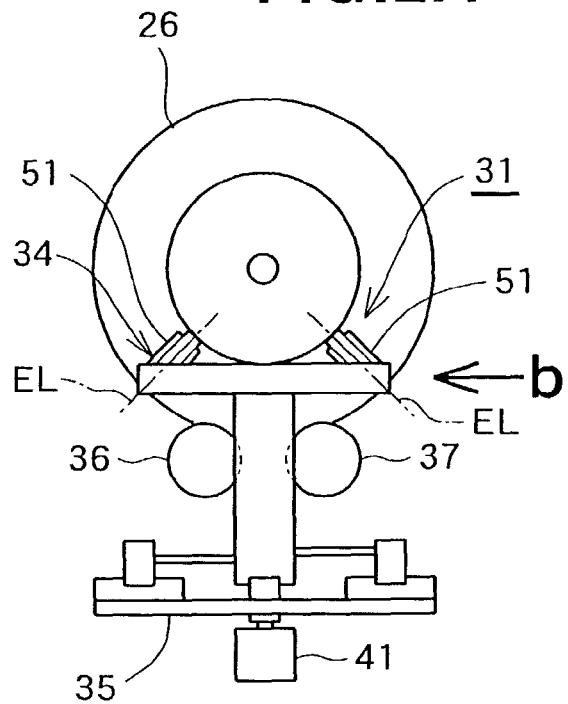
FIG. 2A is a side view showing part of the wheel runout measuring apparatus, FIG. 2B a view in the direction of the arrow b in FIG. 2A and FIG. 2C a view in the direction of the arrow c in FIG. 2B.
Figure 2B:
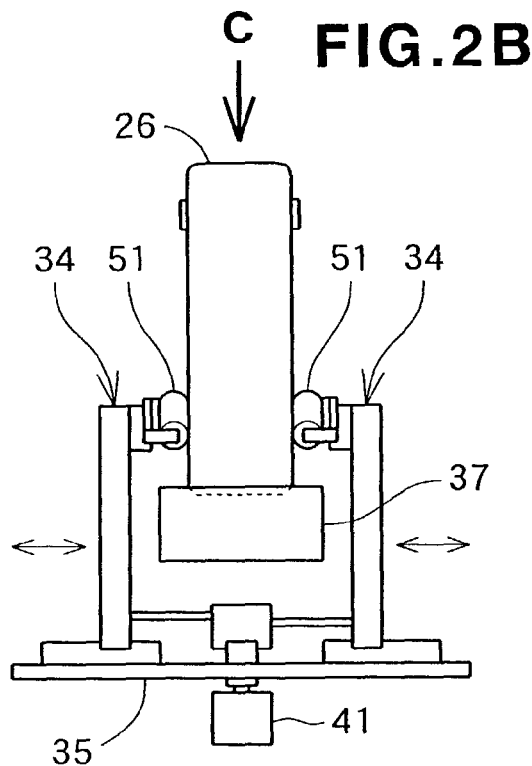
Figure 2C:
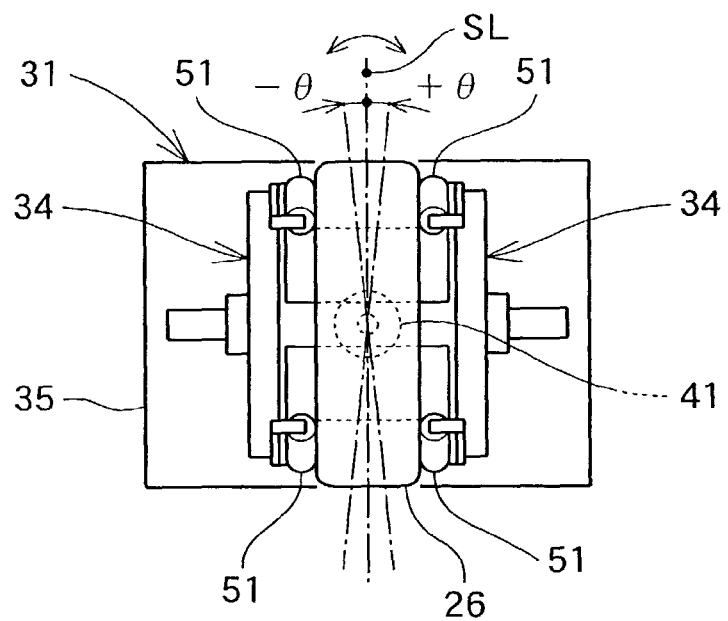

FIGS. 2A through 2C are views for explaining this wheel runout measuring apparatus for applying a wheel runout measuring method according to the invention: FIG. 2A is a side view; FIG. 2B is a view in the direction of the arrow b in FIG. 2A; and FIG. 2C is a view in the direction of the arrow c in FIG. 2B.

In FIG. 2A, the roller mechanisms 34 of the wheel supporter 31 have contact rollers 51, 51 for pressing the sides of the front wheel 26, and the contact rollers 51, 51 are disposed so that the extension lines EL of their axes of rotation point downward and outward.

The driving rollers 36, 37 are driven by electric motors (not shown), and by making contact with the lower peripheral face of the front wheel 26 they apply a turning force to the front wheel 26. Alternatively, just the roller 36 may be made a driving roller, and the roller 37 made a following roller which has no driving force.

Referring now to FIG. 2B, the roller mechanisms 34 are mounted on the base 35 movably in the direction of the axis of rotation of the front wheel 26; and when the wheel runout is not being measured, the roller mechanisms 34 are moved to move the contact rollers 51, 51 away from the front wheel 26.

In FIG. 2C, when runout arises in the front wheel 26, that is, when the front wheel 26 oscillates to the left and right (through an angle of $+\theta$ to $-\theta$) with respect to a reference line SL which is the centerline of the front wheel 26, the whole of the wheel supporter 31 oscillates to the left and right along with the runout of the front wheel 26, and the angle sensor 41 mounted to the bottom of the base 35 detects a runout angle of the wheel supporter 31. That is, a runout angle corresponding to the level of runout of the front wheel 26 can be detected by the angle sensor 41 by way of the wheel supporter 31.

Figure 3:
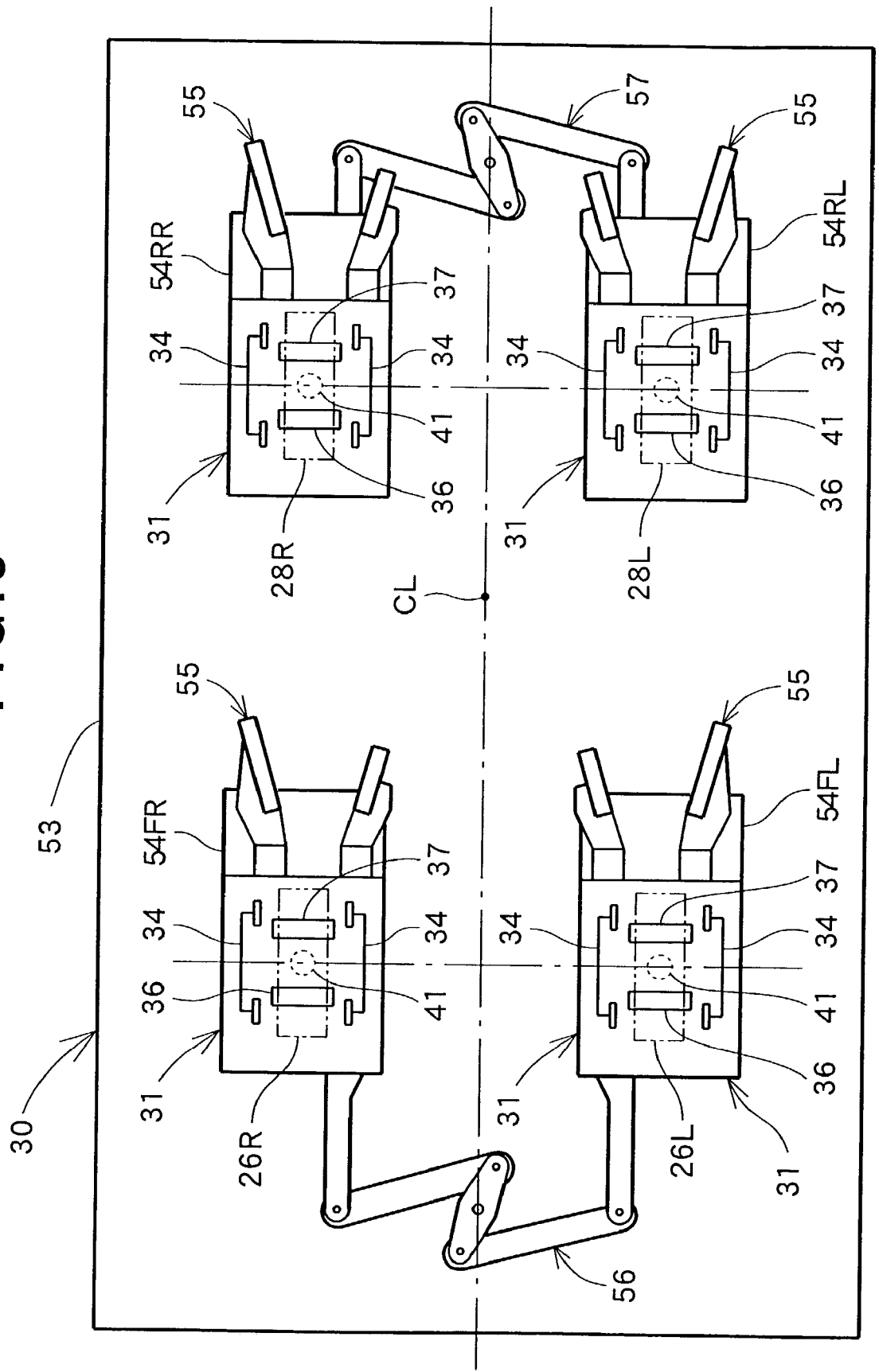
FIG. 3 is a plan view showing the whole wheel runout measuring apparatus.

FIG. 3 is a plan view of the wheel runout measuring apparatus. The wheel runout measuring apparatus 30 is made up of a vehicle table 53; sliding tables 54FL, 54FR for the front wheels and sliding tables 54RL, 54RR for the rear wheels, mounted movably in the up-down and left-right directions of the figure; wheel supporters 31, 31 mounted on the sliding tables 54FL, 54FR and the sliding tables 54RL and 54RR, and, above these wheel supporters 31, wheel guides 55 for guiding the front wheels 26L, 26R and the rear wheels 28L, 28R of the vehicle; a link mechanism 56 for moving each of the front-wheel sliding tables 54FL, 54FR through the same distance from the centerline CL of the wheel runout measuring apparatus 30, and a link mechanism 57 for moving each of the rear-wheel sliding tables 54RL, 54RR through the same distance from the centerline CL.

The wheel supporters 31 for the rear wheels are also fitted with angle sensors 41 and rotation sensors 42 of the kind illustrated in FIG. 1, and the signal processing part 32 also performs signal processing for measuring runout of the rear wheels.

Next, a wheel runout measuring method used by this wheel runout measuring apparatus 30 will be described, on the basis of FIG. 4 through FIG. 7B.

Figure 4:
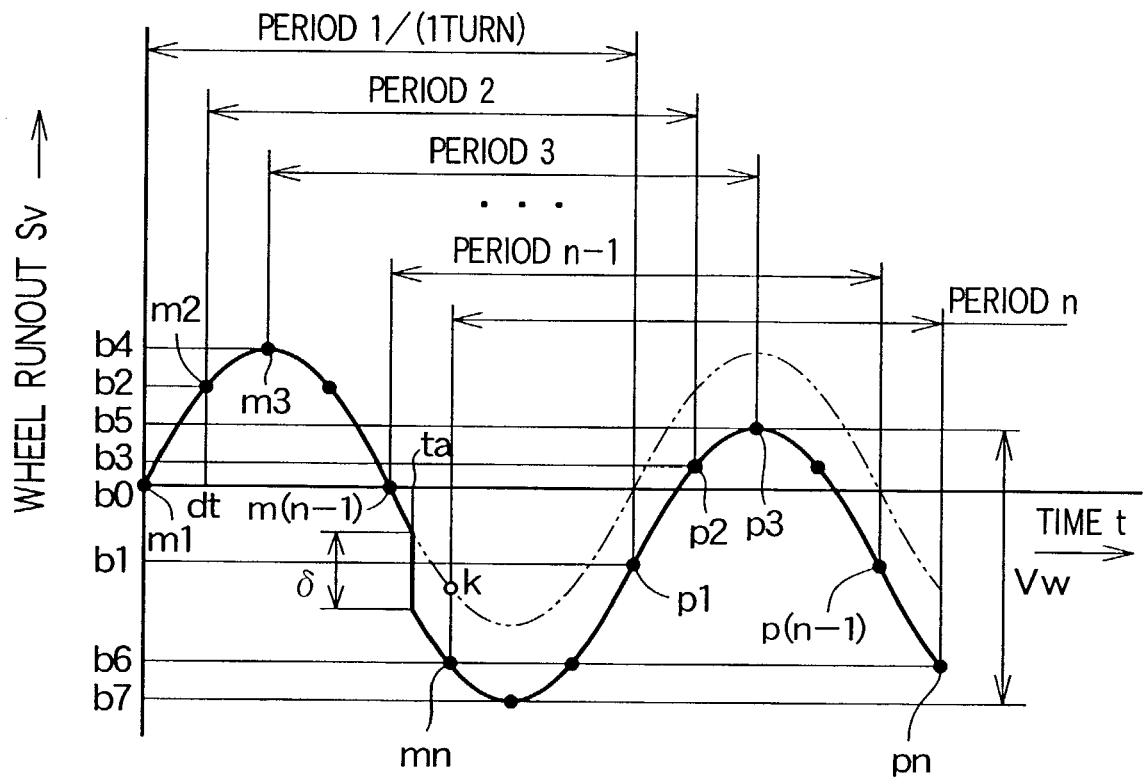
FIG. 4 is a graph illustrating a wheel runout measuring method pertaining to a first embodiment of the invention.

In FIG. 4, the vertical axis shows wheel runout Sv (wheel runout angle, with for example the positive side showing wheel runout to the $+\theta$ side shown in FIG. 2C and the negative side showing wheel runout to the $-\theta$ side shown in FIG. 2C), and the horizontal axis shows time t. The curves in the figure are continuous data on wheel runout, and the points on the curves are actual measurement points. In the following discussion of FIGS. 4 and 5, the description will refer to any one wheel, and this may be either a front wheel or a rear wheel. And in the discussion of FIGS. 4 through 6, toe-in, which will be discussed later, will not be considered, and only wheel runout will be discussed.

First, a vehicle is carried onto the vehicle table 53 shown in FIG. 3 and positioned, and the vehicle wheels are set in the wheel supporters 31 by being sandwiched between the roller mechanisms 34, 34 of the wheel supporters 31.

The driving rollers 36, 37 are then rotated to rotate the vehicle wheels at a predetermined speed.

As the rotation of the vehicle wheels is started, measurement of the wheel runouts (wheel runout angles) is begun by the angle sensors 41.

Referring to FIG. 4, the wheel runout Sv is measured at intervals of a time dt, so that it is measured at a measurement point m1 at time zero, wheel runout zero (b0), at a measurement point m2 a time dt after this measurement point m1, at a measurement point m3 a time dt after this measurement point m2, and so on thereafter. This set time interval dt is inputted using the input means 43.

Now, for example it will be supposed that at a time ta after the measurement at the measurement point m(n−1) the wheel is shifted by some outside force and thereafter the wheel runout Sv has changed to the negative side by δ1.

As a result of this, the measurement point following the measurement point m(n−1) is not the measurement point k on the curve shown with a dotted line but rather becomes the measurement point mn on the curve shifted by δ1 to the negative side, shown with a solid line.

And when the wheel runout b1 has been measured at the measurement point p1 at which the wheel has rotated through one revolution since the measurement point m1, the wheel runout zero (b0) at the measurement point m1 and the wheel runout b1 at the measurement point p1 are compared. That is, the difference between the wheel runout zero (b0) at the starting point of the period 1 and the wheel runout b1 at the end point is calculated.

If the difference b1 between the wheel runout at the start point and that at the end point is within a set runout match determination range, it is determined that the start point wheel runout zero (b0) and the end point wheel runout b1 match, and measurement is ended, and if the difference b1 is outside the runout match determination range then measurement is continued.

Here, a runout match determination value will be written Vst and the runout match determination range will be made −Vst to +Vst. In this case, it is determined that the difference b1 is outside the distance match determination range −Vst to +Vst, that is, |b1|>Vst, and measurement is continued.

Next, at the time of the measurement point p2, it is determined whether or not the difference (b3−b2) between the wheel runout b2 at the measurement point m2 and the wheel runout b3 at the measurement point p2 at the start and end of a period 2 during which the disc rotates through one revolution is within the runout match determination range −Vst to +Vst.

In this period 2, because the measurement point m2 is on the pre-wheel-shift curve and the measurement point p2 is on the post-wheel-shift curve, |b3−b2|>Vst and measurement is continued further.

And also in period 3, |b5−b4|>Vst and measurement is continued.

As measurement is continued further and the period n immediately after the wheel shifted, whose start point is the measurement point mn and whose end point is the measurement point pn, is reached, because both the measurement points mn and pn are points on the post-wheel-shift curve and from the wheel runout b6 at the measurement point mn and the wheel runout b6 at the measurement point pn the relationship −Vst≦(b6−b6)≦Vst, that is, |b6−b6|≦Vst (i.e. 0≦Vst) holds, measurement is ended.

And accordingly, the difference Vw between the maximum wheel runout value b5 and the minimum wheel runout value b7 in the period n becomes the sought wheel runout amplitude.

If the difference between the wheel runout Sv at the starting point and the wheel runout Sv at the end point does not fall within the runout match determination range in any period, measurement is ended when a set measurement time Mt (further discussed later) inputted through the input means 43 (see FIG. 1) is reached.

Figure 5:
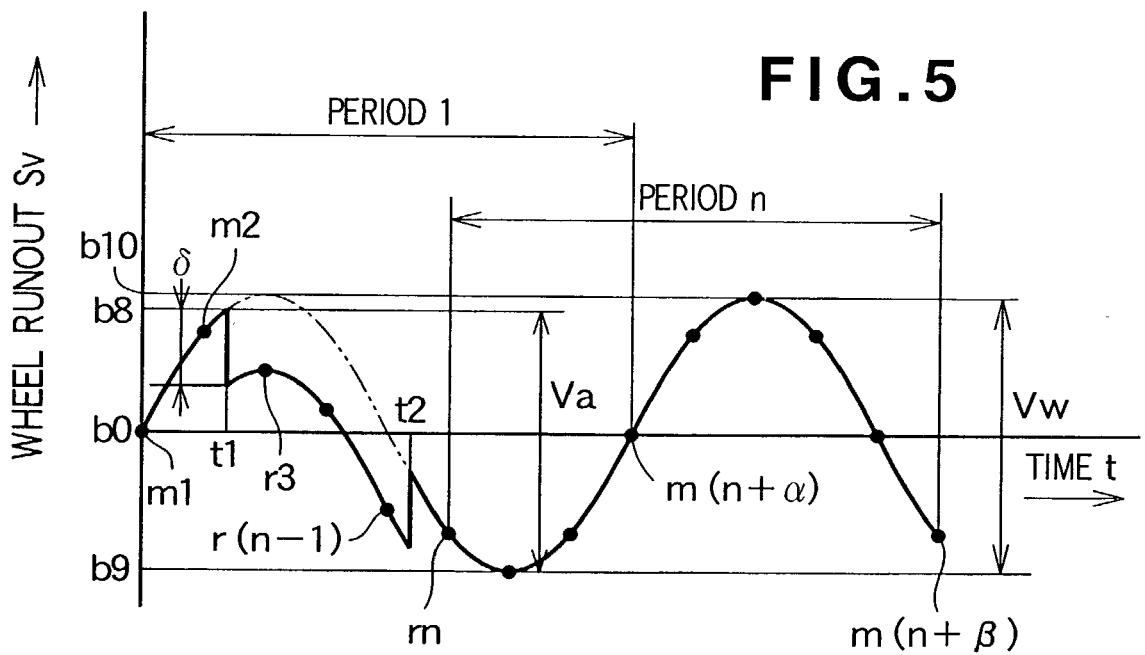
FIG. 5 is a graph illustrating, in connection with the wheel runout measuring method of the first embodiment, a shifted wheel having returned to its original position.

Referring to FIG. 5, it will now be supposed that in measurement of the wheel runout Sv, for example at a time t1 reached after the measurement at the measurement point m2, the wheel shifts under some outside force and thereafter the wheel runout Sv has shifted to the negative side through δ. As a result of this, the measurement point following the measurement point m2 becomes a measurement point r3 on the curve shifted through δ to the negative side, shown with a solid line.

Hereafter, measurement is continued on this curve shown with a solid line shifted through δ to the negative side; however, for example if at a time t2 reached after a measurement is taken at the measurement point r(n−1) the shifted wheel returns to its original position, the measurement point following the measurement point r(n−1) becomes the measurement point rn on the original curve, also shown at this point with a solid line, which is δ to the positive side of the shifted curve.

In the period 1 from the measurement point m1 to the measurement point m(n+α) in which the wheel rotates through one revolution, from wheel runout zero (b0) at the measurement point m1 and wheel runout zero (b0) at the measurement point m(n+α), the difference between these values of wheel runouts is zero and, as explained with reference to FIG. 4, falls within the runout match determination range −Vst to +Vst.

Accordingly, with just the processing explained above with reference to FIG. 4, the difference Va between the maximum wheel runout b8 and the minimum wheel runout b9 in period 1 is taken as the wheel runout amplitude, and consequently it is not possible to measure the wheel runout Vw (the difference between the maximum wheel runout b10 and the minimum wheel runout b9) correctly.

Figure 6:
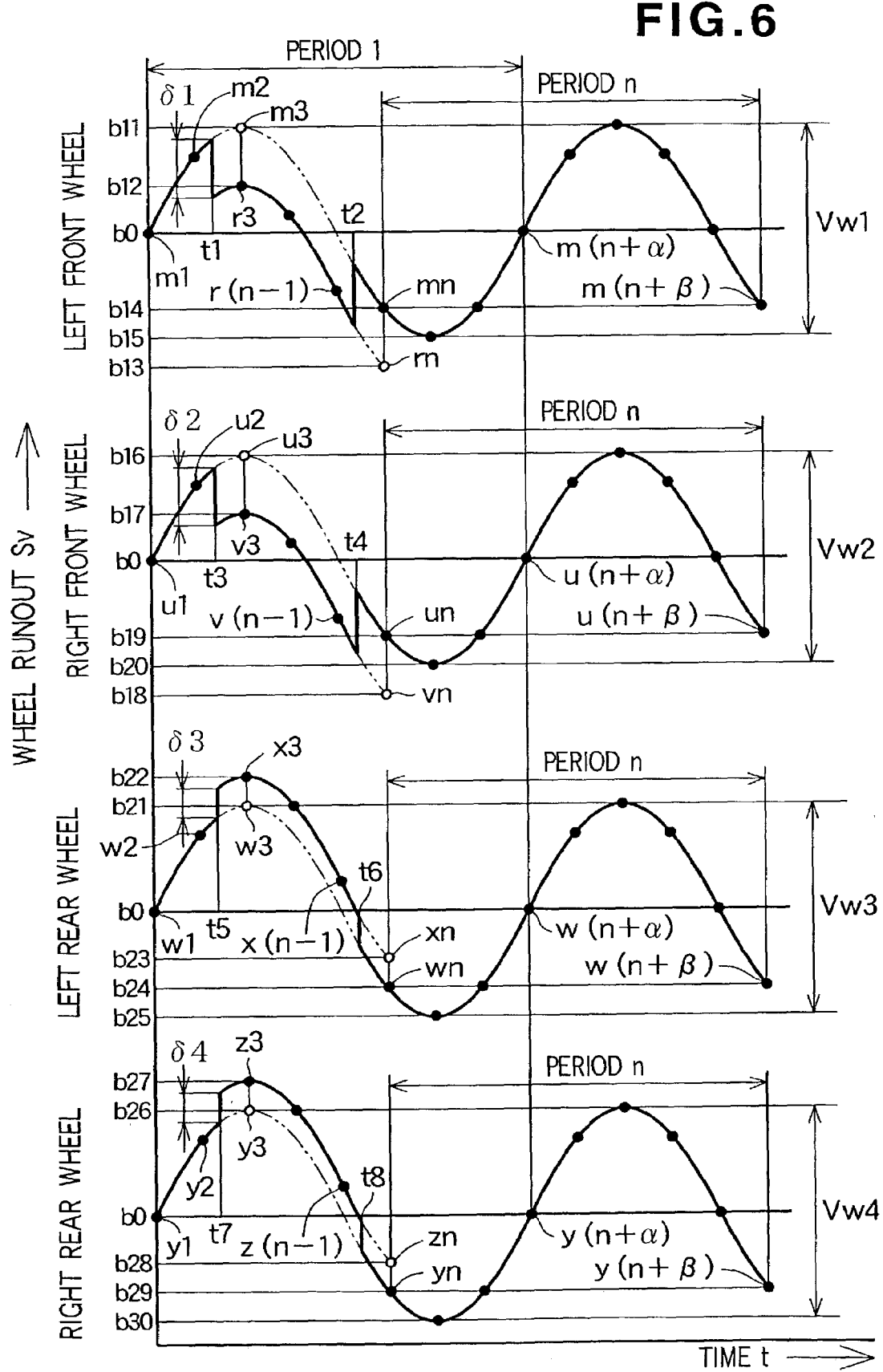
FIG. 6 is a graph illustrating, in connection with the wheel runout measuring method of the first embodiment, runouts of left and right front wheels and left and right rear wheels.

To overcome this, processing described below with reference to FIG. 6 is carried out by the computing/storing means 45 (see FIG. 1), and when during measurement of the wheel runout Sv for some reason the wheel displaces and then the wheel returns to its original position within one revolution, measurement of the wheel runout Sv is continued and a correct wheel runout Vw is measured in the period n. FIG. 6 illustrates a case for each of the wheels 26L, 26R, 28L, 28R.

Referring to FIG. 6, the vertical axis shows the wheel runout Sv of each of the wheels of the vehicle (the left front wheel, the right front wheel, the left rear wheel, the right rear wheel), and the horizontal axis shows time t.

Here, for the left front wheel it will be supposed that the wheel runout Sv displaces through δ1 to the negative side at a time t1, and at a time t2 the wheel runout Sv shifts through δ1 to the positive side and so returns to the original curve.

For the right front wheel it will be supposed that the wheel runout Sv displaces through δ2 to the negative side at a time t3, and at a time t4 the wheel runout Sv shifts through δ2 to the positive side and so returns to the original curve.

For the left rear wheel it will be supposed that the wheel runout Sv displaces through δ3 to the positive side at a time t5, and at a time t6 the wheel runout Sv shifts through δ3 to the negative side and so returns to the original curve.

For the right rear wheel it will be supposed that the wheel runout Sv displaces through δ4 to the positive side at a time t7, and at a time t8 the wheel runout Sv shifts through δ4 to the negative side and so returns to the original curve.

At the left front wheel, the difference between the wheel runout zero (b0) at the measurement point m1, which is the starting point of a period 1 during which the wheel rotates through one revolution, and the wheel runout zero (b0) at the measurement point m(n+α), which is the end point, is within the runout match determination range −Vst to +Vst, and accordingly the following processing is carried out.

When measurements have been taken at the measurement points m1 and m2, the computing/storing means 45 (see FIG. 1) stores the respective times and wheel runouts of these measurement points m1 and m2, and from this data calculates a measurement point m3 expected to be the next measurement point.

Then, it determines whether or not the difference (b12−b11) between the wheel runout b11 of this measurement point m3 and the wheel runout b12 actually measured at the measurement point r3 is within a wheel shift determination range −Cst to +Cst; that is, whether or not the wheel has shifted. Here, Cst is a wheel shift determination value.

If the difference (b12−b11) is outside the wheel shift determination range −Cst to +Cst, it is determined that the wheel has shifted, and measurement is carried out over a period having the measurement point r3 as its start point.

And similarly thereafter, from the data of the time and wheel runout of each measurement point at which a measurement has been made, the wheel runout at the next measurement point is predicted, and for each measurement it is determined whether or not the difference between this wheel runout and the wheel runout of the measurement point actually measured is within the wheel shift determination range −Cst to +Cst.

Also, after the measurement at the measurement point r(n−1), the computing/storing device 45 calculates a measurement point rn expected to become the next measurement point from stored data on the times t and wheel runouts Sv of the measurement points from the measurement point r3 to the measurement point r(n−1).

And it is determined whether or not the difference (b14−b13) between the wheel runout b13 of this measurement point rn and the wheel runout b14 at the measurement point mn actually measured is within the wheel shift determination range −Cst to +Cst, i.e. whether or not the wheel has shifted. If the difference (b14−b13) is outside the wheel shift determination range −Cst to +Cst, it is determined that the wheel has shifted and measurement is carried out over a period having the measurement point mn as its start point.

If then no shift of the wheel is detected again in the period n from the measurement point mn to the measurement point m(n+β), measurement of the wheel runout is ended. The difference between the maximum wheel runout b11 and the minimum wheel runout b15 in this period n is the wheel runout amplitude Vw1 of the left front wheel.

And also for the right front wheel, the wheel runout measuring method is the same as for the left front wheel. That is, because the difference between the wheel runouts at the measurement point u1 and the measurement point u(n+α) of period 1 is within −Vst to +Vst, the computing/storing means 45 predicts the measurement point u3 from the measurement points u1 and u2. And if the difference (b17−b16) between the wheel runouts at this measurement point u3 and the measurement point v3 actually measured is outside −Cst to +Cst, measurement is carried out over a period having the measurement point v3 as its start point.

The computing/storing means 45 predicts a measurement point vn from the data of the measurement points from the measurement point v3 to the measurement point v(n−1). And if the difference (b19−b18) between the wheel runouts at this measurement point vn and the actual measurement point un is outside −Cst to +Cst, measurement is carried out over the period n. If a displacement of the wheel is not detected again in the period n, measurement of the wheel runout is ended and a wheel runout amplitude Vw2 for the right front wheel is obtained from the difference between the maximum wheel runout b16 and the minimum wheel runout b20 in the period n.

And also for the left rear wheel, the wheel runout measuring method is the same as for the left and right front wheels. That is, because the difference between the wheel runouts at the measurement point w1 and the measurement point w(n+α) of period 1 is within −Vst to +Vst, the computing/storing means 45 predicts the measurement point w3 from the measurement points w1 and w2. And if the difference (b22−b21) between the wheel runouts at this measurement point w3 and the actual measurement point x3 is outside −Cst to +Cst, measurement is carried out over a period having the measurement point x3 as its start point.

The computing/storing means 45 predicts a measurement point xn from the data of the measurement points from the measurement point x3 to the measurement point x(n−1).

And if the difference (b24−b23) between the wheel runouts at this measurement point xn and the actual measurement point wn is outside −Cst to +Cst, measurement is carried out over the period n. If a displacement of the wheel is not detected again in the period n, measurement of the wheel runout is ended and a wheel runout amplitude Vw3 for the left rear wheel is obtained from the difference between the maximum wheel runout b21 and the minimum wheel runout b25 in the period n.

And also for the right rear wheel, the wheel runout measuring method is the same as for the left and right front wheels and the left rear wheel. That is, because the difference between the wheel runouts at the measurement point y1 and the measurement point y(n+α) of period 1 is within −Vst to +Vst, the computing/storing means 45 predicts the measurement point y3 from the measurement points y1 and y2. And if the difference (b27−b26) between the wheel runouts at this predicted measurement point y3 and the actual measurement point z3 is outside −Cst to +Cst, measurement is carried out over a period having the measurement point z3 as its start point.

The computing/storing means 45 predicts a measurement point zn from the data of the measurement points from the measurement point z3 to the measurement point z(n−1). And if the difference (b29−b28) between the wheel runouts at this predicted measurement point zn and the actual measurement point yn is outside −Cst to +Cst, measurement is carried out over the period n. If a displacement of the wheel is not detected again in the period n, measurement of the wheel runout is ended and a wheel runout amplitude Vw4 for the right rear wheel is obtained from the difference between the maximum wheel runout b26 and the minimum wheel runout b30 in the period n.

Next, it is determined whether or not the wheel runout amplitudes Vw1 through Vw4 are all below a wheel runout amplitude determination value Vwst; that is, a pass/fail determination is carried out for each of the wheel runout amplitudes Vw1 through Vw4.

If all of the wheel runout amplitudes Vw1 through Vw4 are below the wheel runout amplitude determination value Vwst, the vehicle is awarded a pass; but if on the other hand one or more of the wheel runout amplitudes Vw1 through Vw4 is over the wheel runout amplitude determination value Vwst, because correction of that wheel runout amplitude is necessary, the vehicle is removed from the vehicle table 53.

Figure 7A:
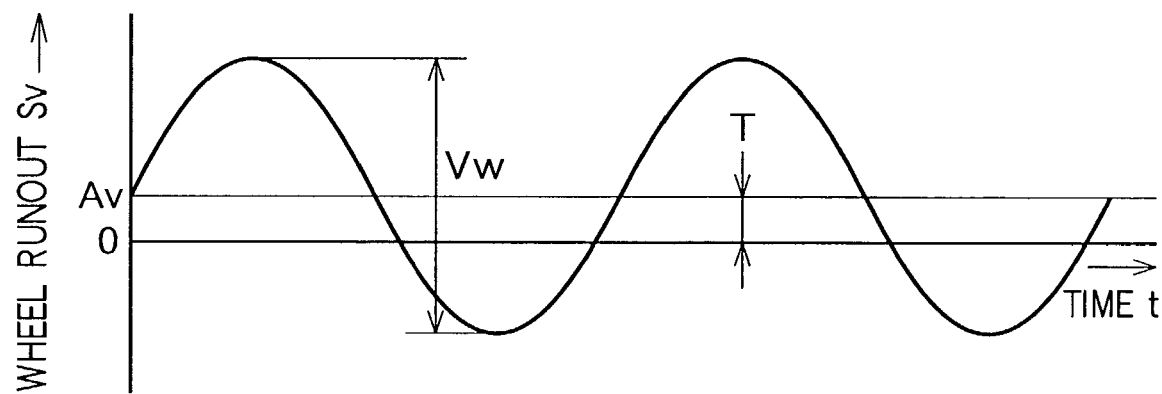
FIG. 7A is a graph showing a relationship between wheel runout and toe-in, and FIG. 7B a schematic view showing toe-in of left and right vehicle wheels.
Figure 7B:
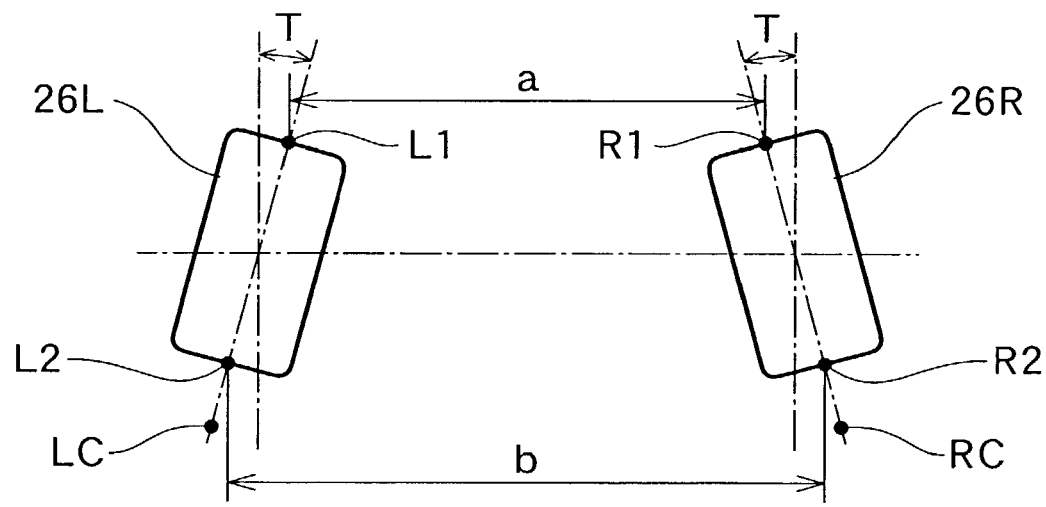

FIG. 7A is a graph showing, in connection with finding the toe-in component of wheel alignment, the relationship between wheel runout and toe-in. The vertical axis shows wheel runout Sv, and the horizontal axis shows time t. FIG. 7B is a schematic view of left and right wheels seen in plan.

After the pass/fail determination is carried out on the wheel runout amplitude obtained in FIGS. 4 through 6, the average Av of the wheel runout amplitude Vw (the average of the maximum and minimum values of the wheel runout amplitude Vw, or the average of the values of the wheel runout Sv measured at the measurement points in a period of one rotation of the wheel) is calculated, and this average value Av is the sought toe angle T.

From the toe angle T obtained in FIG. 7A, the toe-in is obtained as b−a where, when the left and right wheels 26L, 26R are inclined through the toe angle T as shown in FIG. 7B and the intersections of the centerlines LC, RC and the peripheral faces of the wheels 26L and 26R are written L1, L2, R1 and R2, a is the distance between the points L1 and R1 and b is the distance between the points L2 and R2.

As explained above with reference to FIG. 4, the present invention provides a wheel runout measuring method whereby an alignment tester 30 (see FIG. 3) for measuring wheel alignment components such as toe-in and camber angle can be used to measure runout to the side occurring when a wheel 26L, 26R, 28L or 28R (see FIG. 3) rotates. And the method is characterized in that runout measurement is started as rotation of the wheel 26L, 26R, 28L or 28R starts, and if the difference between the runout "be" as of when the wheel has rotated through one revolution (that is, the runout at the end point of a measurement period) and the runout bs as of when measurement was started (that is, the runout at the start point of the measurement period) is within a predetermined range, for example a runout match determination range −Vst to +Vst, then the difference between the maximum and minimum values of the wheel runout Sv in that one revolution is taken as the wheel runout amplitude vw and measurement is ended, and if the difference (be−bs) between the runout "be" at one revolution and the runout bs at the start of measurement is outside the predetermined range (the runout match determination range −Vst to +Vst), measurement is continued until either this difference falls within the predetermined range (within the runout match determination range −Vst to +Vst) or a set measurement time is exceeded.

By checking whether or not the difference (be−bs) between the runout "be" as of when the wheel 26L, 26R, 28L or 28R has rotated through one revolution and the runout bs at the start of measurement is within a predetermined range (the runout match determination range −Vst to +Vst), i.e. whether or not |be−bs|≦Vs, for example when the wheel 26L, 26R, 28L or 28R shifts and the measured runout value shifts through δ it is possible to exclude this shifted measured runout value, and consequently an accurate runout value can be obtained.

Also, as explained with reference to FIG. 6, according to the invention, runout measurement is started as rotation of the wheel 26L, 26R, 28L or 28R starts; on the basis of already measured runouts the runout at the next measurement point is predicted; and on the basis of a comparison of the runout bp at this predicted measurement point and the runout br at the measurement point actually measured it is determined, according to whether or not the difference (br−bp) between the two is within a wheel shift determination range −Cst to +Cst, whether or not the wheel 26L, 26R, 28L or 28R has been shifted by an outside force. When it is determined that the wheel 26L, 26R, 28L or 28R has not shifted, then further, on the basis of a comparison of the wheel runout amplitude Vw, which is the difference between the maximum and minimum values of the runout in one rotation, with a wheel runout amplitude determination value Vwst, a pass/fail determination is carried out on the wheel runout amplitude Vw according to whether or not the wheel runout amplitude Vw is below the wheel runout amplitude determination value Vwst; and when on the other hand it is determined that the wheel has shifted, measurement of the runout is carried out again.

Because by comparing the runout bp of a predicted measurement point and the runout br of a measurement point actually measured in this way it can be more certainly determined whether or not the wheel 26L, 26R, 28L or 28R has shifted and measurement can be carried out over a period not including measurements subjected to such a shift of the wheel 26L, 26R, 28L or 28R, an accurate runout can be obtained at all times. Consequently, wheel alignment can be measured with good precision, and the accuracy of wheel alignment adjustment can be raised. And along with this, the straight-line stability and steering characteristics of the vehicle can be improved.

Figure 8:
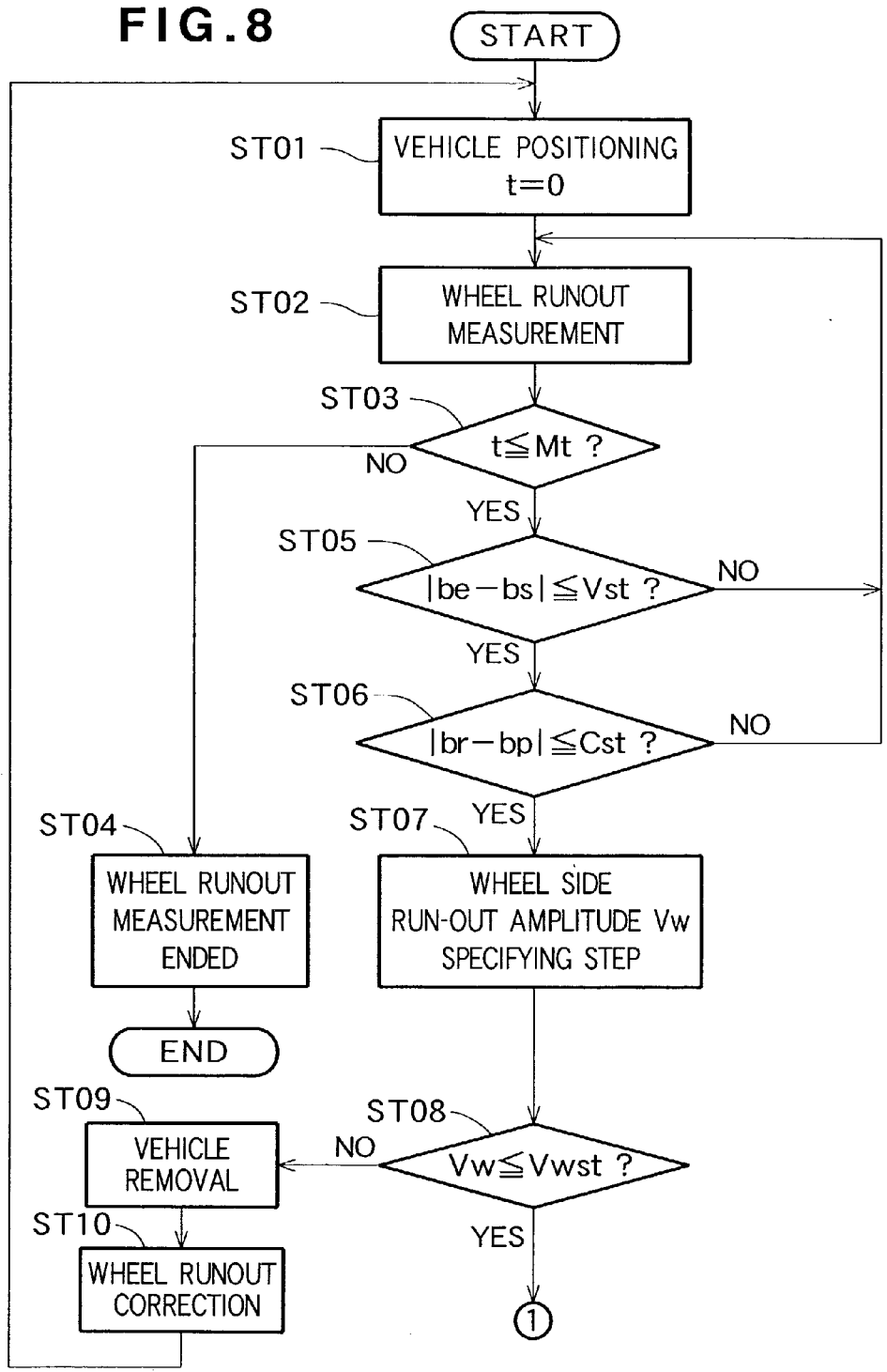
FIG. 8 and FIG. 9 show a flow chart of the wheel runout measuring method of the first embodiment.
Figure 9:
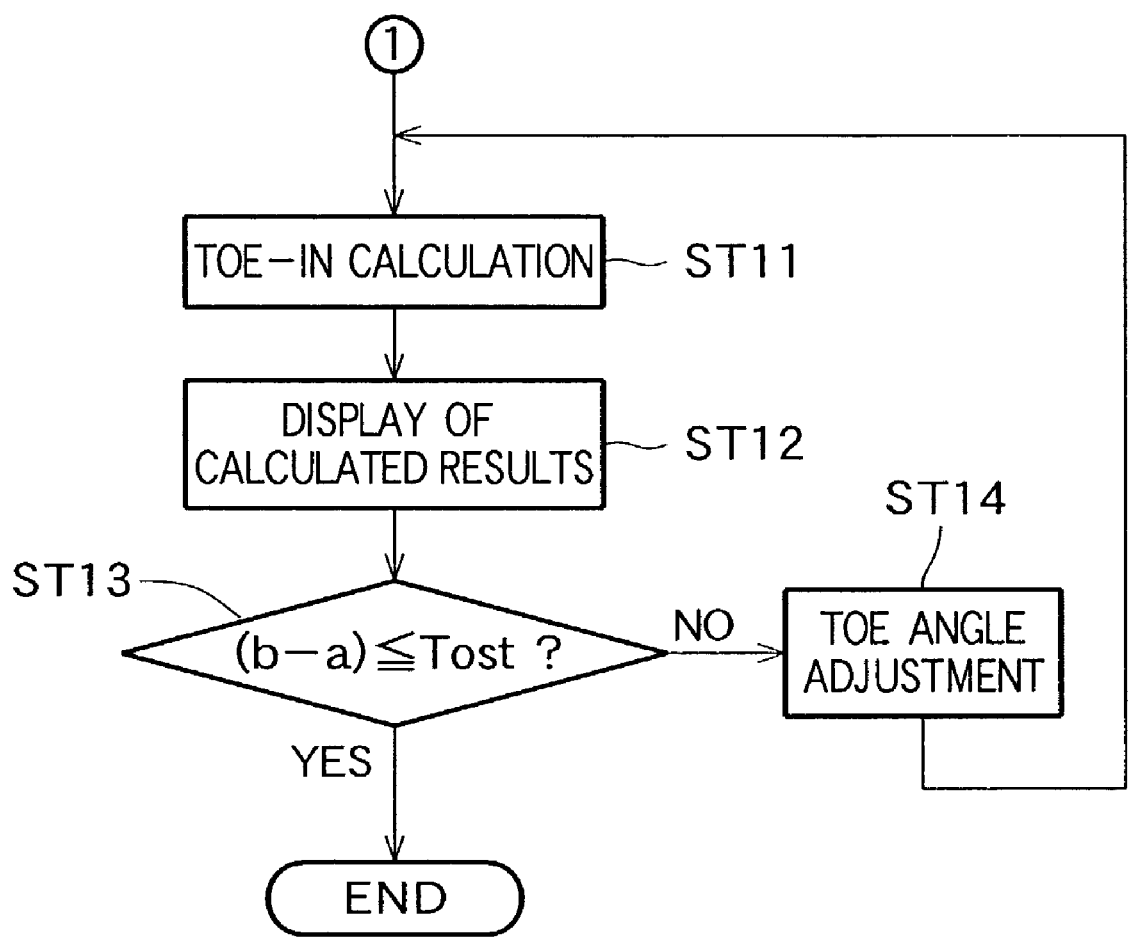

The wheel runout measuring method explained above with reference to FIGS. 4 through 7B is shown in a flow chart in FIGS. 8 and 9.

Step (hereinafter, ST) 01: The vehicle is carried onto the vehicle table and positioned, and the vehicle wheels are set in the wheel supporters.

ST02: Wheel runout measurement is started. At this time, a timer is turned ON.

ST03: It is determined whether or not the elapsed time t from timer ON is below a set measurement time Mt; that is, whether or not $t \leq Mt$. When $t > Mt$, processing proceeds to ST04, and when $t \leq Mt$, processing proceeds to ST05.

ST04: Wheel runout measurement is ended.

ST05: To determine whether or not there is recurrence in the wheel runouts at the start point and the end point of a measurement period in which the wheel rotates through one revolution, it is determined whether or not the difference (be−bs) between the wheel runout bs at the start point of the measurement period and the wheel runout "be" at the end point is within a runout match determination range −Vst to +Vst; that is, whether or not $|be-bs| \leq Vst$. When $|be-bs| > Vst$, processing returns to ST02, and when $|be-bs| \leq Vst$ then processing proceeds to ST06.

ST06: To determine whether or not the wheel has shifted during measurement, it is determined for each measurement whether or not the difference (br−bp) between the wheel runout br at the actual measurement point and the wheel runout bp at the respective predicted measurement point is within a wheel shift determination range −Cst to +Cst; that is, if $|br-bp| \leq Cst$. When $|br-bp| > Cst$, processing returns to ST02, and when $|br-bp| \leq Cst$ then processing proceeds to ST07.

ST07: The difference between the maximum and minimum values of the runout in one revolution of the wheel is specified as the wheel runout amplitude Vw.

ST08: It is determined whether or not the specified wheel runout amplitude Vw is below a wheel runout amplitude determination value Vwst; that is, if $Vw \leq Vwst$. When $Vw > Vwst$, processing proceeds to ST09, and when $Vw \leq Vwst$, processing proceeds to ST11.

ST09: The vehicle is carried off the vehicle table.

ST10: The wheel runout is corrected. After that, processing returns to ST01.

(Referring now to FIG. 9) ST11: The toe-in is calculated.

ST12: The calculated toe-in result is displayed on the display means.

ST13: It is determined whether or not the toe-in (b−a) is below a toe-in determination value Tost; that is, if $(b-a) \leq Tost$. When $(b-a) \leq Tost$ does not hold (NO) then processing proceeds to ST14, and when $(b-a) \leq Tost$ then the toe-in, that is, wheel alignment, check is ended.

ST14: The length of the tie rod is adjusted, to adjust the toe angle. Thereafter, processing returns to ST11.

Next, as a second embodiment of the invention, a method for checking whether or not, in a four-wheel vehicle, any of the four wheels has shifted during wheel runout measurement, that is, whether or not there is an abnormality in the wheel runout measurement data, will be explained on the basis of FIG. 10 and FIG. 11.

Figure 10:
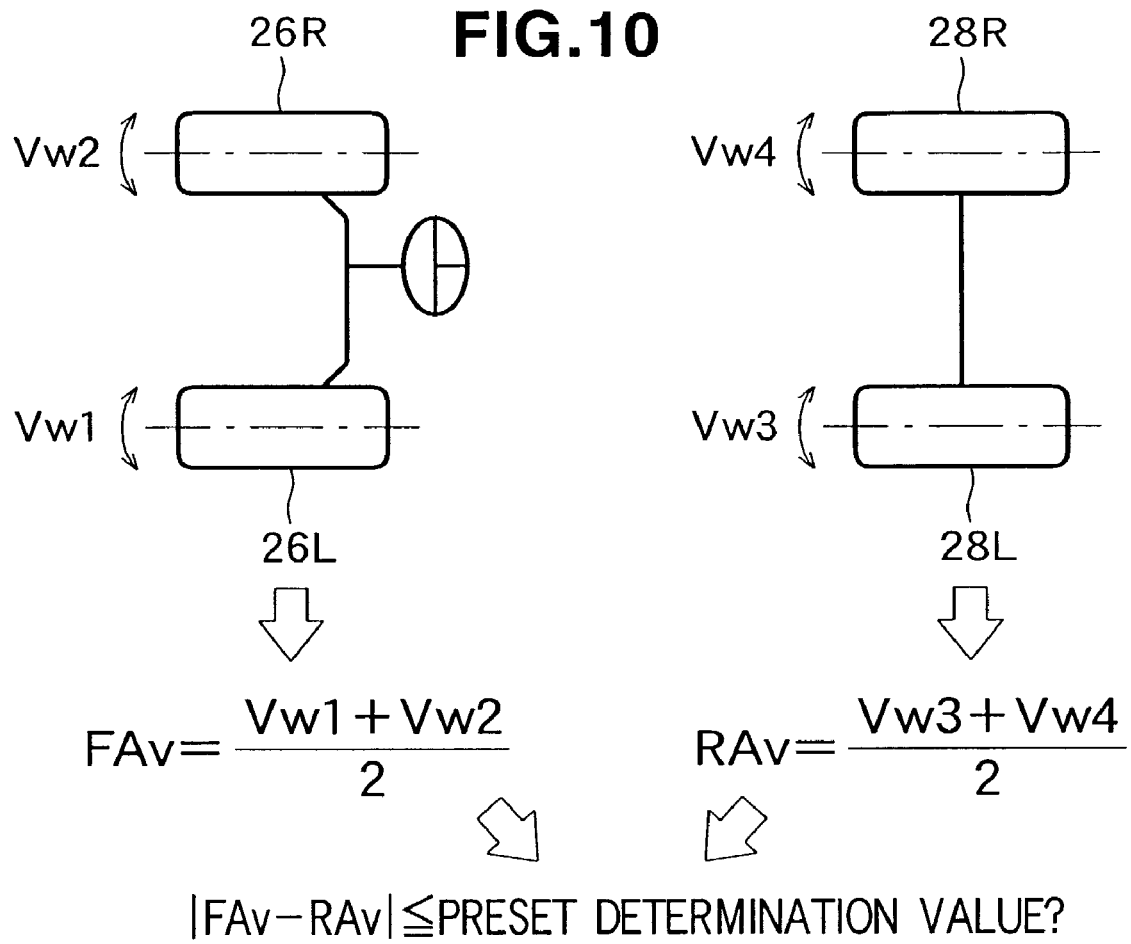
FIG. 10 is a view illustrating a wheel runout measuring method pertaining to a second embodiment of the invention.
Figure 11:
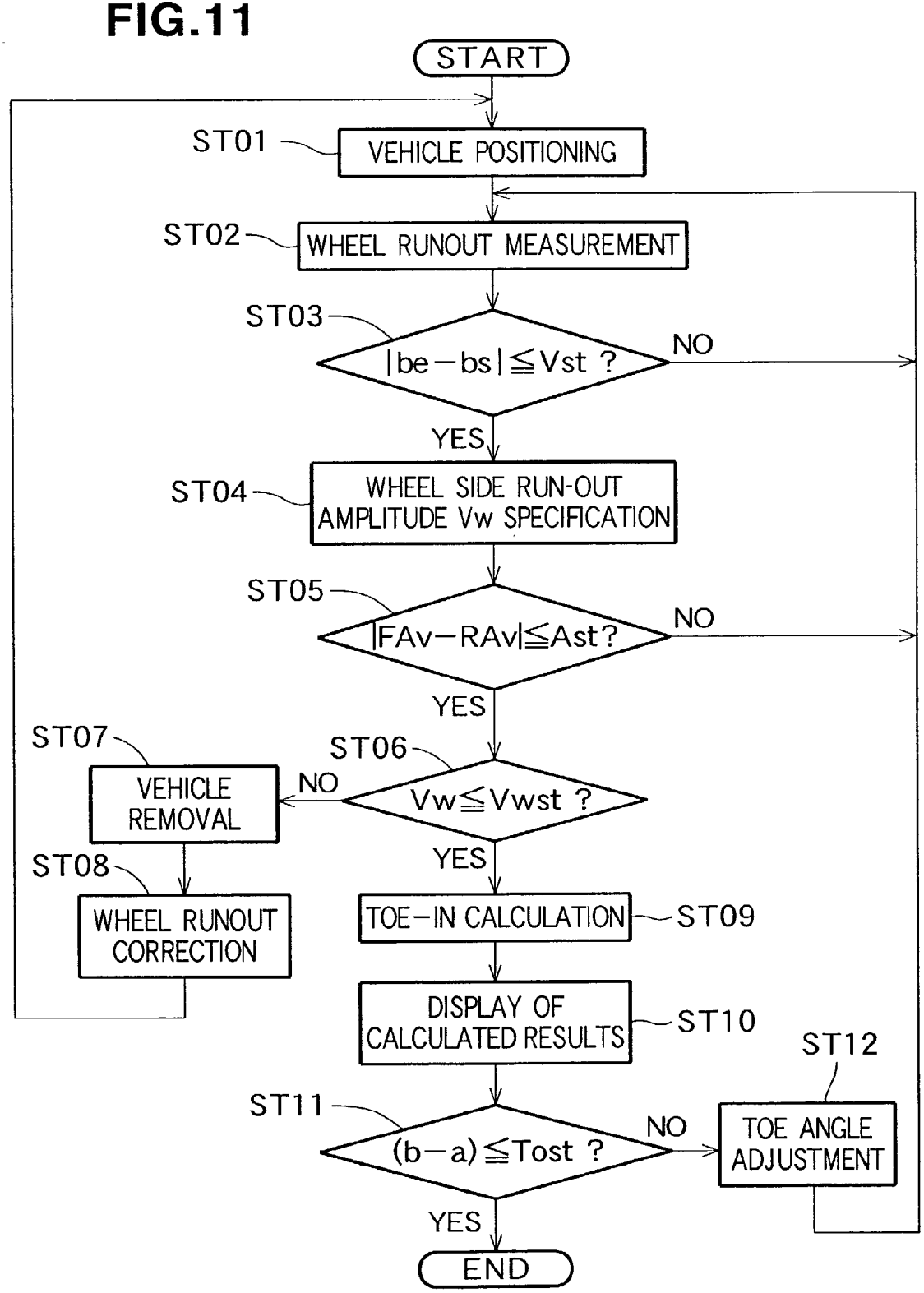
FIG. 11 is a flow chart of the wheel runout measuring method of the second embodiment.

Referring to FIG. 10, if the wheel runout amplitudes of the left front wheel 26L, the right front wheel 26R, the left rear wheel 28L and the right rear wheel 28R are respectively written Vw1, Vw2, Vw3 and Vw4, the average FAv of the wheel runout amplitudes Vw1, Vw2 of the left and right front wheels 26L, 26R is FAv=(Vw1+Vw2)/2. And the average RAv of the wheel runout amplitudes Vw3, Vw4 of the left and right rear wheels 28L, 28R is Rav=(Vw3+Vw4)/2.

It is determined whether or not the absolute value of the difference between the average FAv for the front wheels 26L, 26R and the average RAv for the rear wheels 28L, 28R is smaller than or equal to a preset determination value (namely, an abnormality determination value); that is, whether or not $|FAv-RAv| \leq$ preset determination value.

When any of the wheel runout amplitudes Vw1, Vw2, Vw3 and Vw4 is abnormally large, the average FAv or the average RAv becomes large, $|FAv-RAv|$ becomes large, and $|FAv-RAv|$ rises above the preset determination value. In this case, it is determined that an abnormal wheel runout amplitude has been measured in a front wheel or a rear wheel.

Next, this measuring method constituting a second embodiment will be explained on the basis of the flow chart shown in FIG. 11.

ST01: The vehicle is carried onto the vehicle table and positioned, and the wheels are set in the wheel supporters.

ST02: Wheel runout measurement is started.

ST03: To determine whether or not there is recurrence in the wheel runouts at the start point and the end point of a measurement period in which the wheel rotates through one revolution, it is determined whether or not the difference (be−bs) between the wheel runout bs at the start point of the measurement period and the wheel runout "be" at the end point is within a runout match determination range −Vst to +Vst; that is, whether or not $|be-bs| \leq Vst$. When $|be-bs| > Vst$, processing returns to ST02, and when $|be-bs| \leq Vst$ then processing proceeds to ST04.

ST04: The difference between the maximum and minimum values of the runout in one revolution of the wheel is specified as the wheel runout amplitude Vw.

ST05: It is determined whether or not the absolute value of the difference between the average FAv of the wheel runout amplitudes of the front wheels 26L, 26R and the average RAv of the wheel runout amplitudes of the rear wheels 28L, 28R is smaller than or equal to an abnormality determination value (preset determination value) Ast; that is, whether or not $|FAv-RAv| \leq Ast$. When $|FAv-RAv| > Ast$, processing returns to ST02, and when $|FAv-RAv| \leq Ast$, processing proceeds to ST06.

ST06: It is determined whether or not the measured wheel runout amplitude vw is below a wheel runout amplitude determination value Vwst (a pass, as opposed to a fail); that is, whether or not $Vw \leq Vwst$. When $Vw \leq Vwst$ does not hold, processing proceeds to ST07, and when $Vw \leq Vwst$, processing proceeds to ST09.

ST07: The vehicle is carried off the vehicle table.

ST08: The wheel runout is corrected. Thereafter, processing returns to ST01.

ST09: The toe-in is calculated.

ST10: The calculated toe-in result is displayed on the display means.

ST11: It is determined whether or not the toe-in (b−a) is below a toe-in determination value Tost; that is, if (b−a)≦Tost. When (b−a)>Tost then processing proceeds to ST12, and when (b−a)≦Tost then the toe-in, that is, wheel alignment, check is ended.

ST12: The length of the tie rod is adjusted, to adjust the toe angle. Thereafter, processing returns to ST02.

Next, a third embodiment of a wheel runout measuring method according to the invention will be explained, on the basis of FIGS. 12 and 13.

Figure 12:
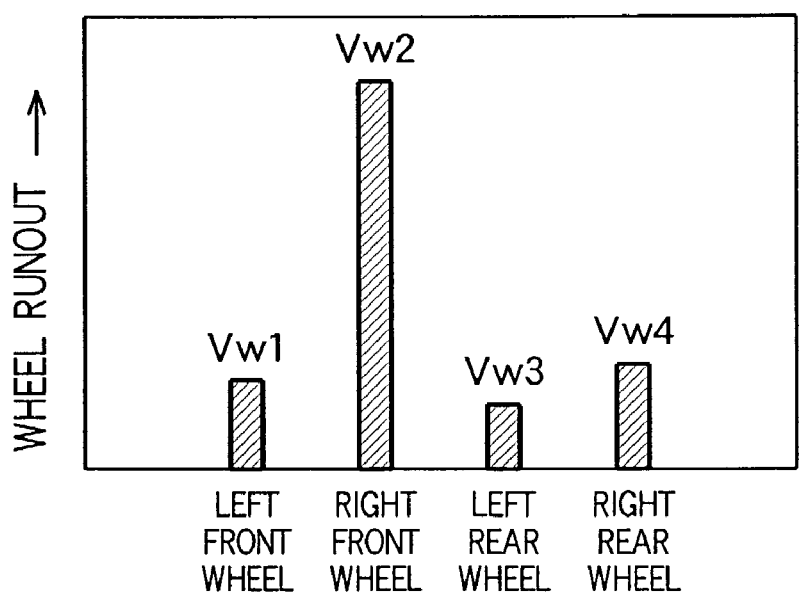
FIG. 12 is a bar chart illustrating a wheel runout measuring method pertaining to a third embodiment of the invention.
Figure 13:
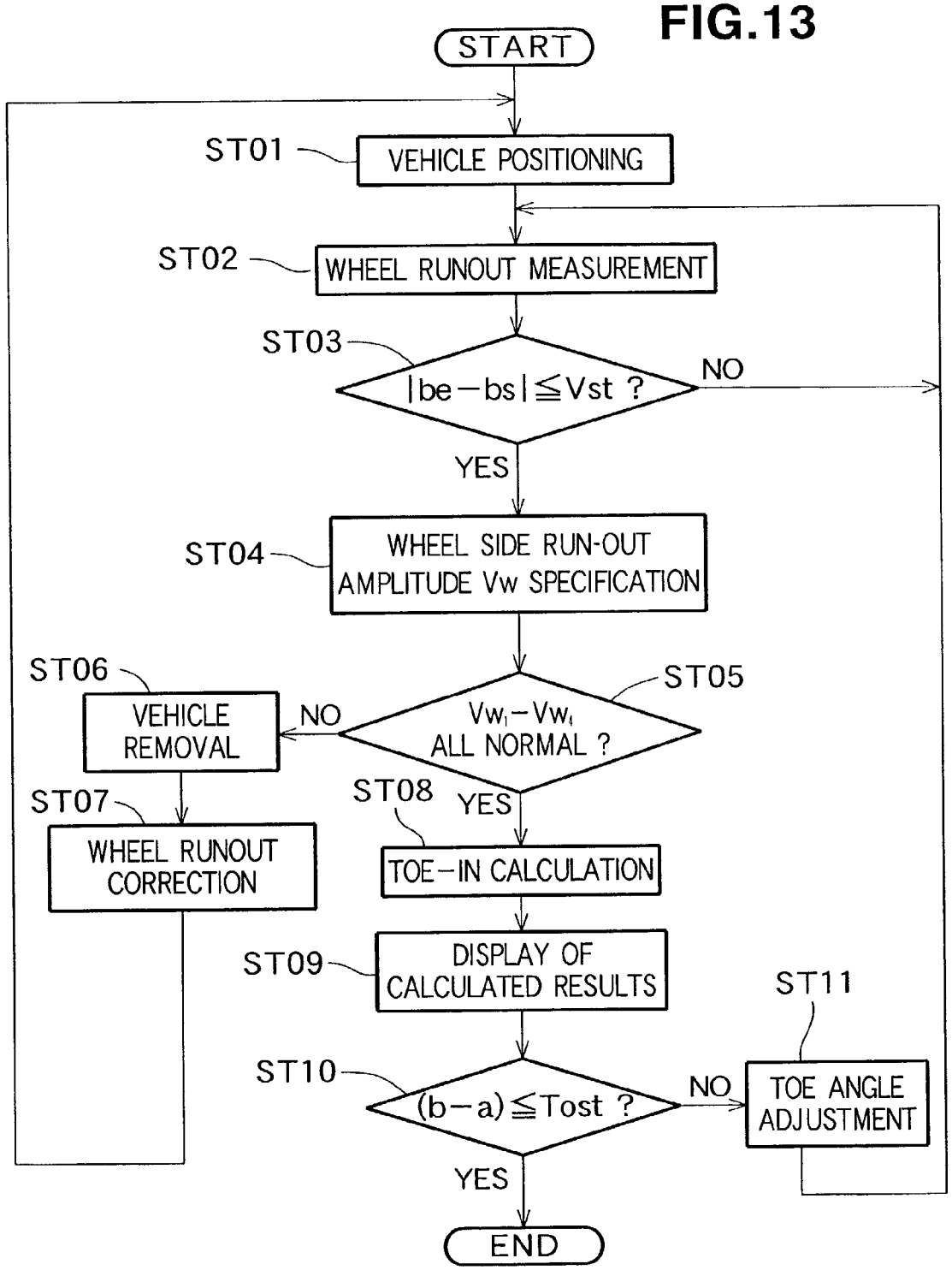
FIG. 13 is a flow chart of the wheel runout measuring method of the third embodiment.
Figure 14:
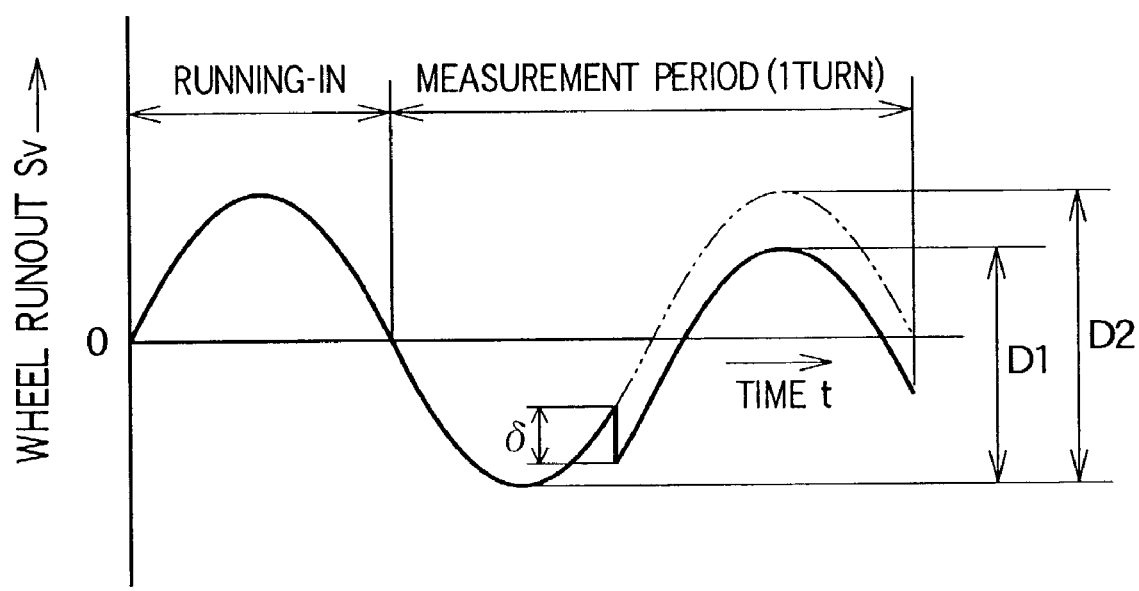
FIG. 14 is a graph illustrating the affect of shifting of a vehicle wheel during wheel runout measurement in related art.

As shown in FIG. 12, if among the measured wheel runout amplitudes Vw1, Vw2, Vw3 and Vw4 of the wheels (the left front wheel 26L, the right front wheel 26R, the left rear wheel 28L and the right rear wheel 28R) for example the wheel runout amplitude Vw2 stands out as being larger than the others, to determine whether or not this wheel runout amplitude Vw2 is an abnormal value, as one statistical analysis method, for example the abnormality test of seeing whether or not the wheel runout amplitude Vw2 lies outside the range of a normal distribution can be carried out.

A measuring method pertaining to a third embodiment will now be described on the basis of the flow chart shown in FIG. 13.

ST01: The vehicle is carried onto the vehicle table and positioned, and the wheels are set in the wheel supporters.

ST02: Wheel runout measurement is started.

ST03: To determine whether or not there is recurrence in the wheel runouts at the start point and the end point of a measurement period in which the wheel rotates through one revolution, it is determined whether or not the difference (be−bs) between the wheel runout bs at the start point of the measurement period and the wheel runout "be" at the end point is within a runout match determination range −Vst to +Vst; that is, whether or not |be−bs|≦Vst. When |be−bs|>Vst, processing proceeds to ST02, and when |be−bs|≦Vst then processing proceeds to ST04.

ST04: The difference between the maximum and minimum values of the runout in one revolution of the wheel is specified as the wheel runout amplitude Vw.

ST05: It is determined by means of a statistical analysis method whether or not the wheel runout amplitudes Vw1 through Vw4 of all the wheels undergoing measurement (the left and right front wheels and the left and right rear wheels) are abnormal. When any of Vw1 through Vw4 is abnormal, processing proceeds to ST06, and when none of Vw1 through Vw4 is abnormal, processing proceeds to ST08.

ST06: The vehicle is carried off the vehicle table.

ST07: The wheel runout is corrected. Thereafter, processing returns to ST01.

ST08: The toe-in is calculated.

ST09: The calculated toe-in result is displayed on the display means.

ST10: It is determined whether or not the toe-in (b−a) is below a toe-in determination value Tost; that is, if (b−a)≦Tost. When (b−a)>Tost then processing proceeds to ST11, and when (b−a)≦Tost then the toe-in, that is, wheel alignment, check is ended.

ST11: The length of the tie rod is adjusted, to adjust the toe angle. Thereafter, processing returns to ST02.

The wheel runout measuring method according to the invention described above was applied in a contact-type fashion, whereby roller mechanisms 34 are brought into contact with the vehicle wheel to detect wheel runout; however, the invention is not limited to this, and alternatively a wheel runout measuring method according to the invention may be applied in a noncontact-type fashion, using any of various kinds of noncontact displacement sensors.

Also, a wheel runout measuring method according to the invention is not limited to four-wheel vehicles, and may alternatively be applied to a three-wheel vehicle for example having two front wheels and one rear wheel, or to a vehicle with six or more wheels.

In the embodiments described above, as of wheel alignment, only toe-in was obtained, but the invention is not limited to this, and camber angle also may be obtained.

INDUSTRIAL APPLICABILITY

In this invention, for example when measuring the runout of a vehicle wheel, it is checked whether or not the difference between the runout at the start point of a period during which the wheel rotates through one revolution and the runout at the end point of the period is within a predetermined range. Consequently, even if during the measurement the wheel shifts and the measured runout value shifts, it is possible to exclude this shifted measured runout value, and an accurate wheel runout value and wheel runout amplitude can be obtained. As a result, it is possible to measure wheel alignment factors such as toe-in and camber angle with good accuracy, and the invention is particularly useful in the vehicle inspection field.

The invention claimed is:

1. A wheel runout measuring method for measuring a lateral runout of a vehicle wheel by turning the wheel on rotating rollers, comprising the steps of:

executing measurement of a lateral runout of a wheel while the wheel is rotating on the rotating rollers, and storing runout values corresponding to multiple predetermined angular measurement positions arranged successively at regular intervals in a circumferential direction of the wheel being measured;

determining whether or not a runout difference between runout values measured at the beginning and the end of a single cycle of revolution of the wheel with respect to one of the predetermined angular measurement positions is within a predetermined range; and when said runout difference is determined as being within the predetermined range, specifying the difference between maximum and minimum values of the runout measured for the one angular measurement position during said single cycle of revolution of the wheel as a wheel runout amplitude and terminating the measurement, and alternately when said runout difference is determined as being outside the predetermined range, it is determined that the wheel has shifted under an external force, and in order to eliminate a measurement error caused due to shifting of the wheel, said specifying step is not performed and repeating the determining step for the next predetermined angular measurement position that leads in phase in a direction of rotation of the wheel from the angular measurement position processed at the preceding determining step, until it is determined in the determining step that a runout difference between runout values measured at the beginning and the end of a single cycle of revolution of the wheel with respect to the next predetermined angular measurement position has come within the predetermined range.

2. The wheel runout measuring method of claim 1, wherein when said runout difference at said one angular measurement position is determined as being within said predetermined range, in order to eliminate a measurement error caused due to shifting of the wheel that occurs and ends during said single cycle of revolution of the wheel, said determining step is followed by, prior to said specifying step, the steps of:

estimating runout values at expected measurement positions corresponding to the predetermined angular measurement positions;

performing a comparison between the runout values actually measured at the respective predetermined angular measurement positions and the estimated runout values at the expected measurement positions, each of the estimated runout values being obtained by calculation based on the runout value actually measured at the predetermined angular measurement position that immediately precedes the respective expected measurement position, and when a second runout difference between the actually measured runout value and the estimated runout value at any one of the predetermined angular measurement positions is within a second predetermined range, it is determined that the wheel shifting did not occur within said single cycle of revolution of the wheel, and said specifying step is carried out, and alternatively when said second runout difference is outside the second predetermined range, it is determined that the wheel shifting occurred and ended during said single cycle of revolution of the wheel and said specifying step is not performed and said measurement executing step is performed again.

* * * * *